US008103109B2

(12) United States Patent
Winn et al.

(10) Patent No.: US 8,103,109 B2
(45) Date of Patent: *Jan. 24, 2012

(54) RECOGNIZING HAND POSES AND/OR OBJECT CLASSES (75) Inventors: John Winn, Cambridge (GB); Antonio Criminisi, Cambridge (GB); Ankur Agarwal, Cambridge (GB); Thomas Deselaers, Aachen (DE)

(73) Assignee: Microsoft Corporation, Redmond, WA (US)

( * ) Notice: Subject to any disclaimer, the term of this patent is extended or adjusted under 35 U.S.C. 154(b) by 1197 days.

This patent is subject to a terminal disclaimer.

(21) Appl. No.: 11/765,264

(22) Filed: Jun. 19, 2007

(65) Prior Publication Data
US 2008/0317331 A1    Dec. 25, 2008

(51) Int. Cl.
*G06K 9/62*    (2006.01)
(52) U.S. Cl. ........ 382/224; 382/128; 382/129; 382/130; 382/131; 382/132; 382/173; 382/287; 382/294; 382/305; 382/318
(58) Field of Classification Search .......... 382/224, 382/128, 129, 130, 131, 132, 173, 287, 294, 382/305, 318
See application file for complete search history.

(56) References Cited

U.S. PATENT DOCUMENTS

| | | | |
|---|---|---|---|
| 5,732,227 A | 3/1998 | Kuzunuki et al. | |
| 5,937,079 A * | 8/1999 | Franke | 382/103 |
| 6,128,003 A | 10/2000 | Smith et al. | |
| 6,256,033 B1 | 7/2001 | Nguyen | |
| 6,674,877 B1 | 1/2004 | Jojic et al. | |
| 6,788,809 B1 * | 9/2004 | Grzeszczuk et al. | 382/154 |
| 7,068,842 B2 * | 6/2006 | Liang et al. | 382/181 |
| 7,680,314 B2 * | 3/2010 | Hong | 382/131 |
| 2002/0118880 A1 * | 8/2002 | Liu et al. | 382/199 |
| 2003/0113018 A1 | 6/2003 | Nefian et al. | |
| 2004/0193413 A1 * | 9/2004 | Wilson et al. | 704/243 |
| 2005/0201591 A1 * | 9/2005 | Kiselewich | 382/104 |
| 2006/0136846 A1 | 6/2006 | Im et al. | |
| 2007/0003147 A1 * | 1/2007 | Viola et al. | 382/229 |
| 2008/0168403 A1 * | 7/2008 | Westerman et al. | 715/863 |

OTHER PUBLICATIONS

Breiman, "Random Forests", Kluwer Academic Publishers, 2001, pp. 5-32.
Freeman, et al., "Orientation Histograms for Hand GestureRecognition", available at least as early as May 22, 2007, at <<http://www.merl.com/reports/docs/TR94-03.pdf>>, Mitsubishi Electric Research Laboratories, Inc., 1994, pp. 9.

(Continued)

*Primary Examiner* — Mike Rahmjoo
(74) *Attorney, Agent, or Firm* — Lee & Hayes, PLLC (57) ABSTRACT

There is a need to provide simple, accurate, fast and computationally inexpensive methods of object and hand pose recognition for many applications. For example, to enable a user to make use of his or her hands to drive an application either displayed on a tablet screen or projected onto a table top. There is also a need to be able to discriminate accurately between events when a user's hand or digit touches such a display from events when a user's hand or digit hovers just above that display. A random decision forest is trained to enable recognition of hand poses and objects and optionally also whether those hand poses are touching or not touching a display surface. The random decision forest uses image features such as appearance, shape and optionally stereo image features. In some cases, the training process is cost aware. The resulting recognition system is operable in real-time.

7 Claims, 9 Drawing Sheets

OTHER PUBLICATIONS

Kakadiaris, et al., "Model-based estimation of 3D human motion"., available at least as May 22, 2007, at <<http://ieeexpiore.ieee.org/xpl/freeabs_all.jsp?isNumber=19391&arNumber=895978&isnumber=19391&arnumber=895978>>, IEEE, vol. 22, No. 12, 2000, pp. 1453-1459.

Lockton, et al., "Real-Time Gesture Recognition Using Deterministic Boosting", British Machine Vision Conference, 2002, pp. 817-826.

Moeslund, et al., "Multiple Cues used in Model-Based Human Motion Capture", available at least as early as May 22, 2007, at <<http://www.vision.auc.dk/~tbm/Publications/fg00.pdf>>, Grenoble, France, 2000, pp. 6.

* cited by examiner

RECOGNIZING HAND POSES AND/OR OBJECT CLASSES

BACKGROUND

Object detection and recognition are difficult problems in the field of computer vision. Object detection involves determining the presence of one or more objects in an image of a scene. Image segmentation comprises identifying all image elements that are part of the same object in an image. Object recognition comprises assigning semantic labels to the detected objects. For example, to determine a class of objects that the object belongs to such as cell phones, pens, erasers, or staplers.

In a similar manner automatic recognition of hand poses in images is a difficult problem. Recognition of hand poses might be required for many different applications, such as interpretation of sign language, user interface control, and interpretation of hand poses and gestures in video conferencing.

There is a need to provide simple, accurate, fast and computationally inexpensive methods of object and hand pose recognition for many applications. For example, to enable a user to make use of his or her hands to drive an application either displayed on a tablet screen or projected onto a table top. There is also a need to be able to discriminate accurately between events when a user's hand or digit touches such a display from events when a user's hand or digit hovers just above that display.

The embodiments described below are not intended to be limited to implementations that solve any or all of the above noted disadvantages.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

There is a need to provide simple, accurate, fast and computationally inexpensive methods of object and hand pose recognition for many applications. For example, to enable a user to make use of his or her hands to drive an application either displayed on a tablet screen or projected onto a table top. There is also a need to be able to discriminate accurately between events when a user's hand or digit touches such a display from events when a user's hand or digit hovers just above that display. A random decision forest is trained to enable recognition of hand poses and objects and optionally also whether those hand poses are touching or not touching a display surface. The random decision forest uses image features such as appearance, shape and optionally stereo image features. In some cases, the training process is cost aware. The resulting recognition system is operable in real-time.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a user interface system for driving a software application or other apparatus, the system described is provided as an example and not a limitation. As those skilled in the art will appreciate, the present examples are suitable for application in a variety of different types of image classification systems.

An Exemplary System

Figure 1:
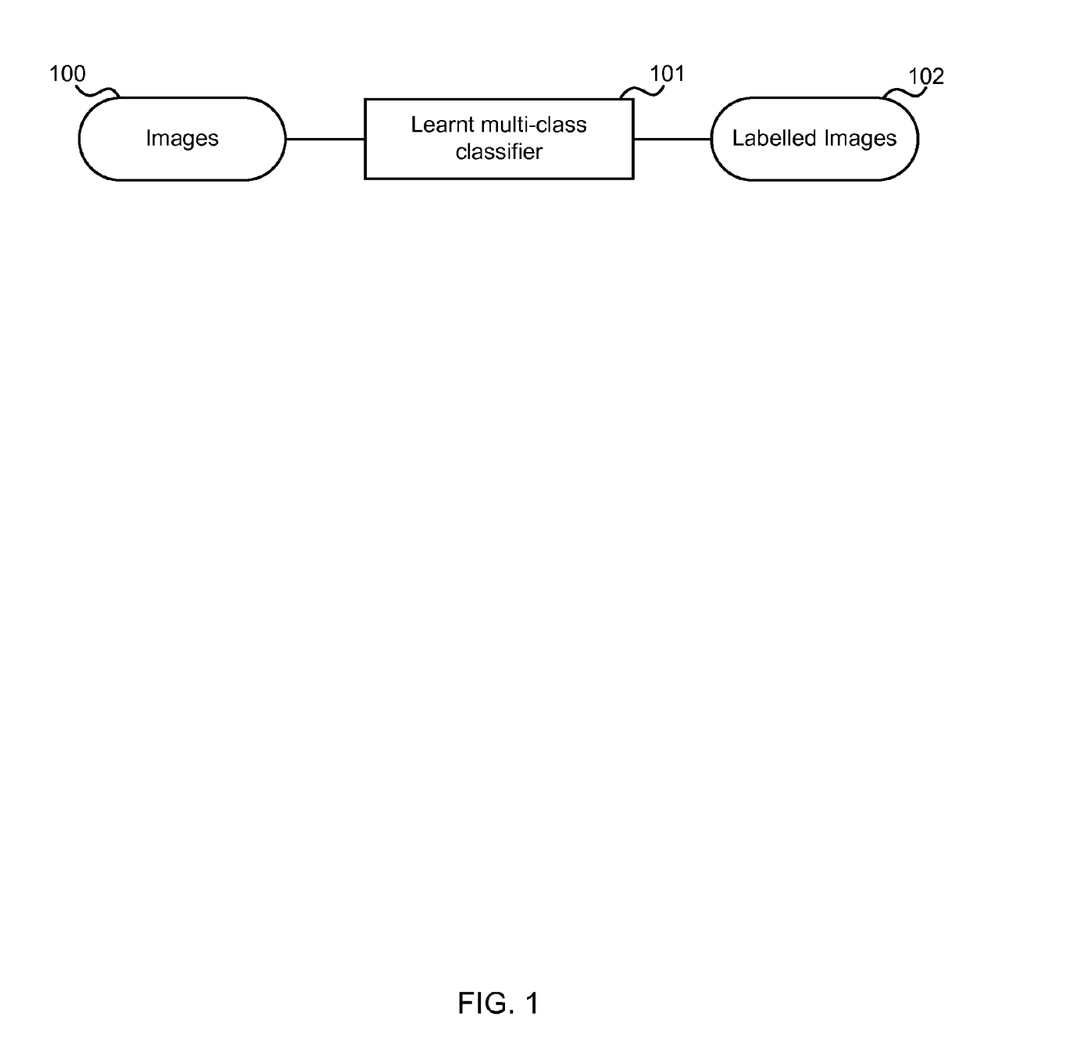
FIG. 1 is a high level schematic diagram of a recognition system.

FIG. 1 is a high level schematic diagram of an image processing system for classifying images of items. For example, this may be used for recognizing hand poses and/or objects. Images 100 are input to the image processing system 101. The images are of items to be classified or labeled as being of one a plurality of specified classes. For example, these classes comprise a plurality of classes of hand pose, such as hand poses with fingers spread out, hand poses with fingers clenched into a fist, hand poses with a pointing index finger etc. The classes may also comprise a plurality of classes of object such as might be found in an office environment. For example, coffee mugs, staplers, rulers, erasers, mobile communications devices, scissors and the like. In addition, the classes may be divided into those in which an item is touching a display surface and those in which an item is not touching a display surface. However, it is not essential to use these particular classes of item; any classes may be used.

The image processing system 101 comprises a learnt multi-class classifier and outputs labeled imaged 102. For example, if the image is of a particular hand pose, the labeled image may indicate which of a specified group of classes of hand pose this image belongs to.

Another Exemplary System

Figure 2:
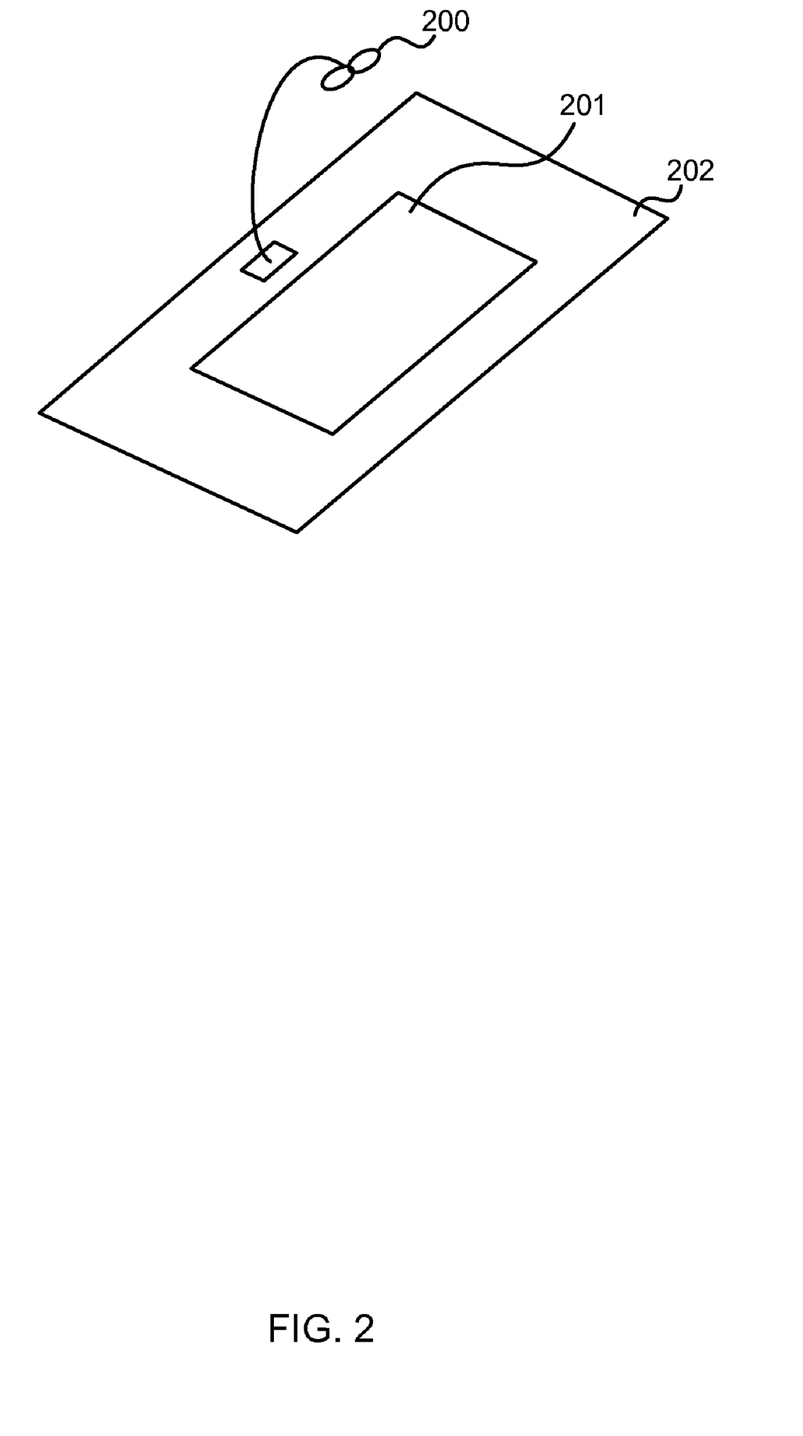
FIG. 2 is a schematic diagram of an example user interface apparatus.

FIG. 2 is a schematic diagram of a user interface apparatus which may be used in conjunction with the image processing system of FIG. 1. A display 201 such as provided by a tablet personal computer is provided on a work surface 202. An image capture device 200 is provided above the work surface 202. Any suitable type of image capture device may be used. A non-exhaustive list of examples is: a mono camera, a stereo camera, a video camera, a web camera, a Z-camera (also known as a time-of-flight camera) and a laser range finder. The image capture device 200 is arranged to capture images of a user's hands or other objects positioned between the image capture device 200 and the display 201. The image processing system may be incorporated in the tablet personal computer and may be arranged to classify images captured by the image processing device 200. This classification information may then be used by a user interface in order to control the display 201 and also in order to drive a software application or other system via the tablet personal computer. For example, by recognizing hand poses and/or objects a user interface may be controlled in a particular manner. Information about whether the hand poses are touching a display surface or not may also be used by such a system to control a software application or other system. For example, this "touch/no-touch" information may be obtained by the image processing system described herein. Alternatively or in addition, it may be obtained using resistive touch overlays at the display surface or by any other touch-sensitive layer or other suitable means.

This example apparatus is described to illustrate how the output of the image processing system of FIG. 1 may be used. However, it is in no way essential to use the image processing system described herein for that purpose. It may be used for any system where image classification information is required.

Another Exemplary System

Figure 3:
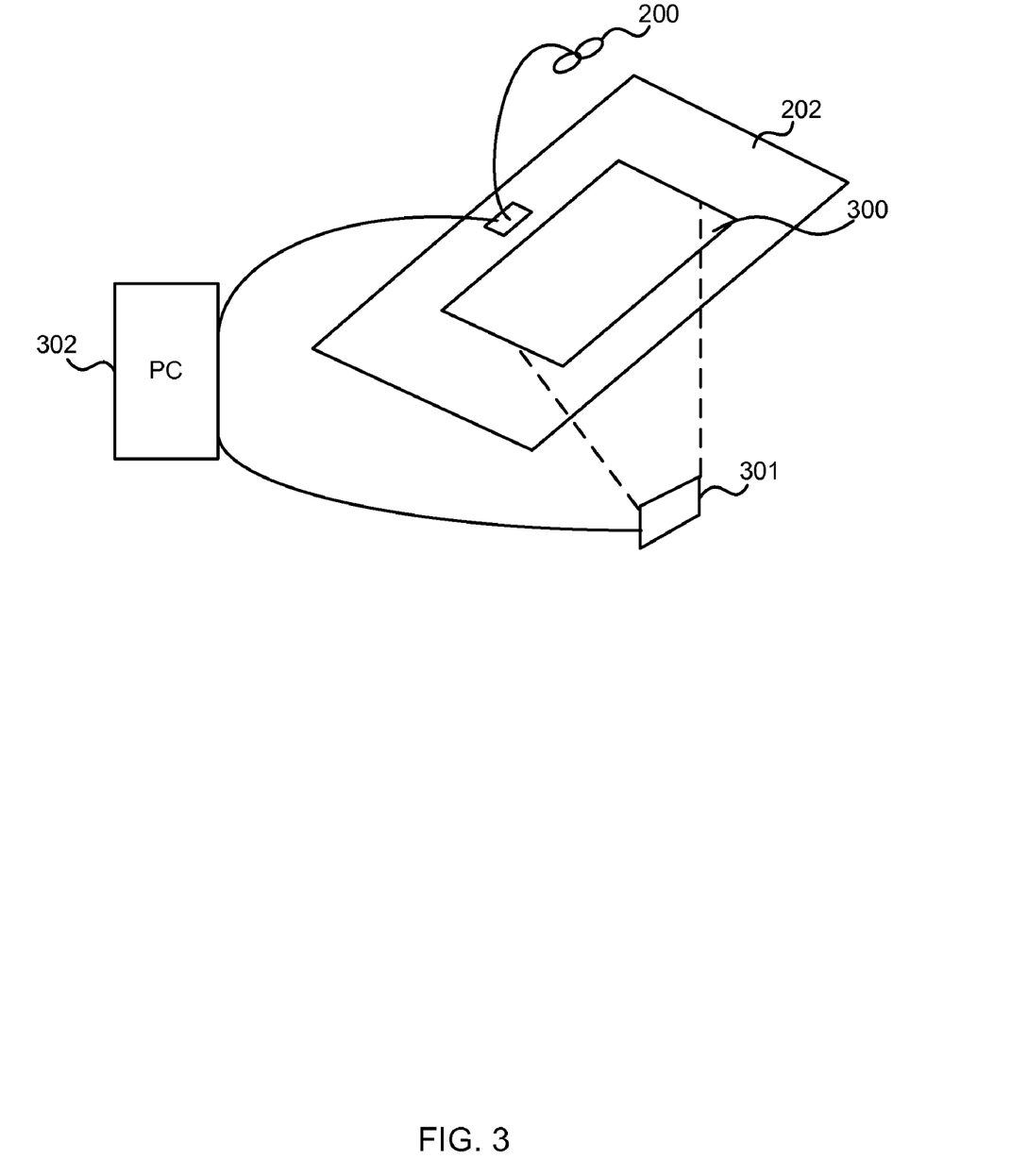
FIG. 3 is a schematic diagram of another example user interface apparatus.

It is also possible to use the image processing system of FIG. 1 to control a display projected onto a surface as illustrated in FIG. 3 for example. A projector 301 projects a display 300 onto a surface 202 such as a table or other work surface. The projector is controlled by a personal computer 302 which also is in communication with an image capture device 200. The image capture device 200 may be a camera, video camera, stereo camera or the like and is arranged to capture images of items against a background of the display as described above with reference to FIG. 2.

Easy and natural interaction in the types of scenarios illustrated in FIGS. 1 and 2 requires accurate and efficient, real-time recognition of different hand poses and objects commonly found in office environments together with the ability to detect when and in what context the user is touching the display. For example, a user might make use of his or her hands together with common objects to drive a software application. A user is able to work on an electronic document for example using physical objects such as pens and erasers, and also manipulate it via hand gestures.

Recognizing different hand poses is challenging due to the large variability in lighting conditions, skin color, hand sizes, the presence of sleeves, etc. Furthermore, touch vs. non-touch discrimination must be robust with respect to different camera setups, hand poses and cases where the hands may or may not be holding objects.

Exemplary Method

Figure 4:
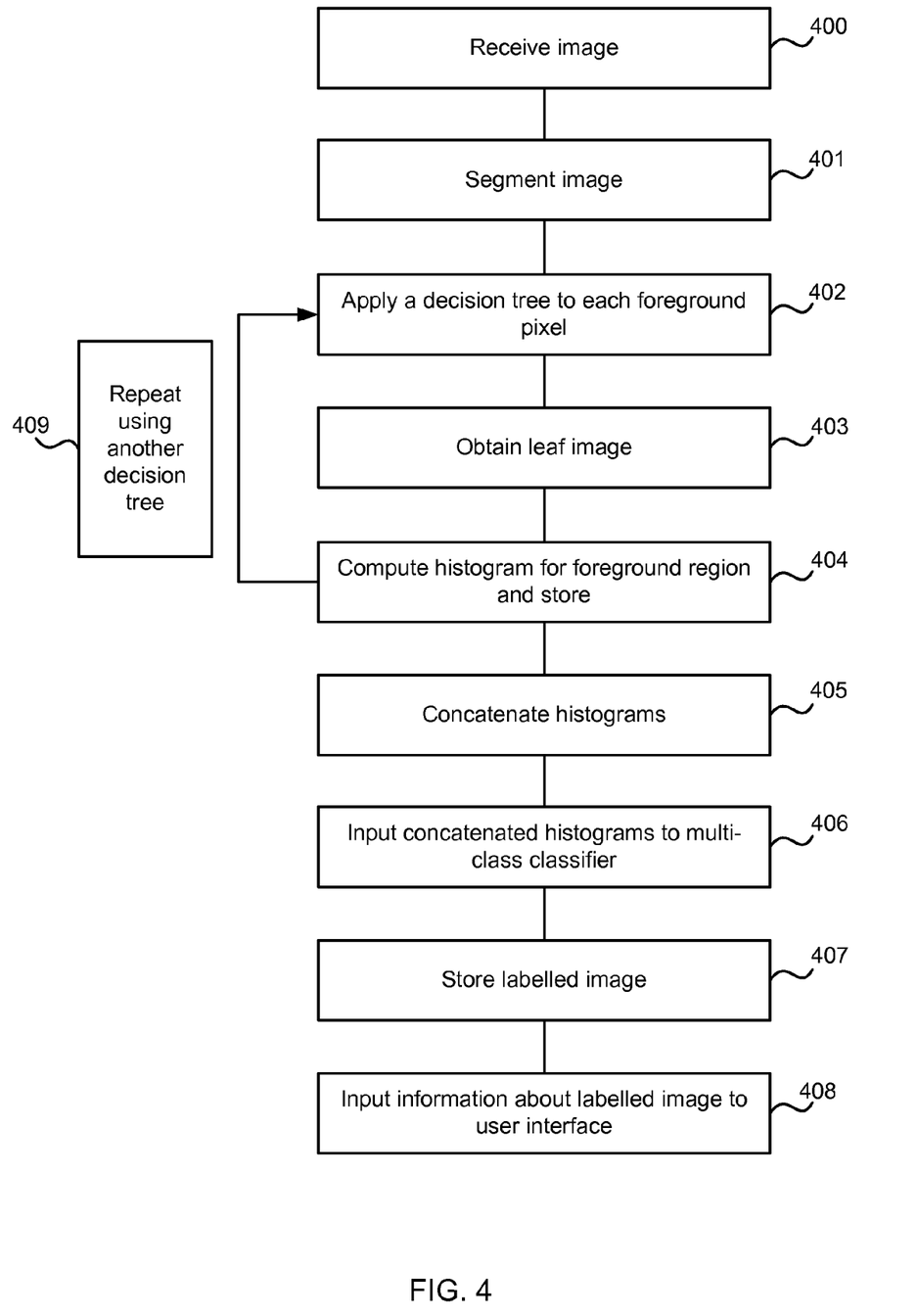
FIG. 4 is a block diagram of an example method of classifying an image.

FIG. 4 is a block diagram of an example method of classifying an image into one of a plurality of specified classes. An image is received (block 400) and segmented into a foreground region and a background region (block 401). Any suitable segmentation method may be used. The image may be received from any suitable type of image capture device as mentioned above including a Z-camera. That is the image may be a depth map from a Z-camera, laser range finder or the like.

For example, polarization information may be used to achieve the segmentation. In this case a first polarizing filter is positioned in front of an image capture device at which the image is captured. A second polarizing filter is used at a display such as the tablet personal computer of FIG. 2. Alternatively a display can be used which emits polarized light. The first and second polarizing filters are crossed with respect to one another so that light from the display is substantially blocked from entering the image capture device. Light reflected from any items such as hands or objects between the display and the image capture device is able to enter the image capture device. In this way the foreground region comprising image of the items may be identified using a thresholding operation or similar on the image.

Figure 7:
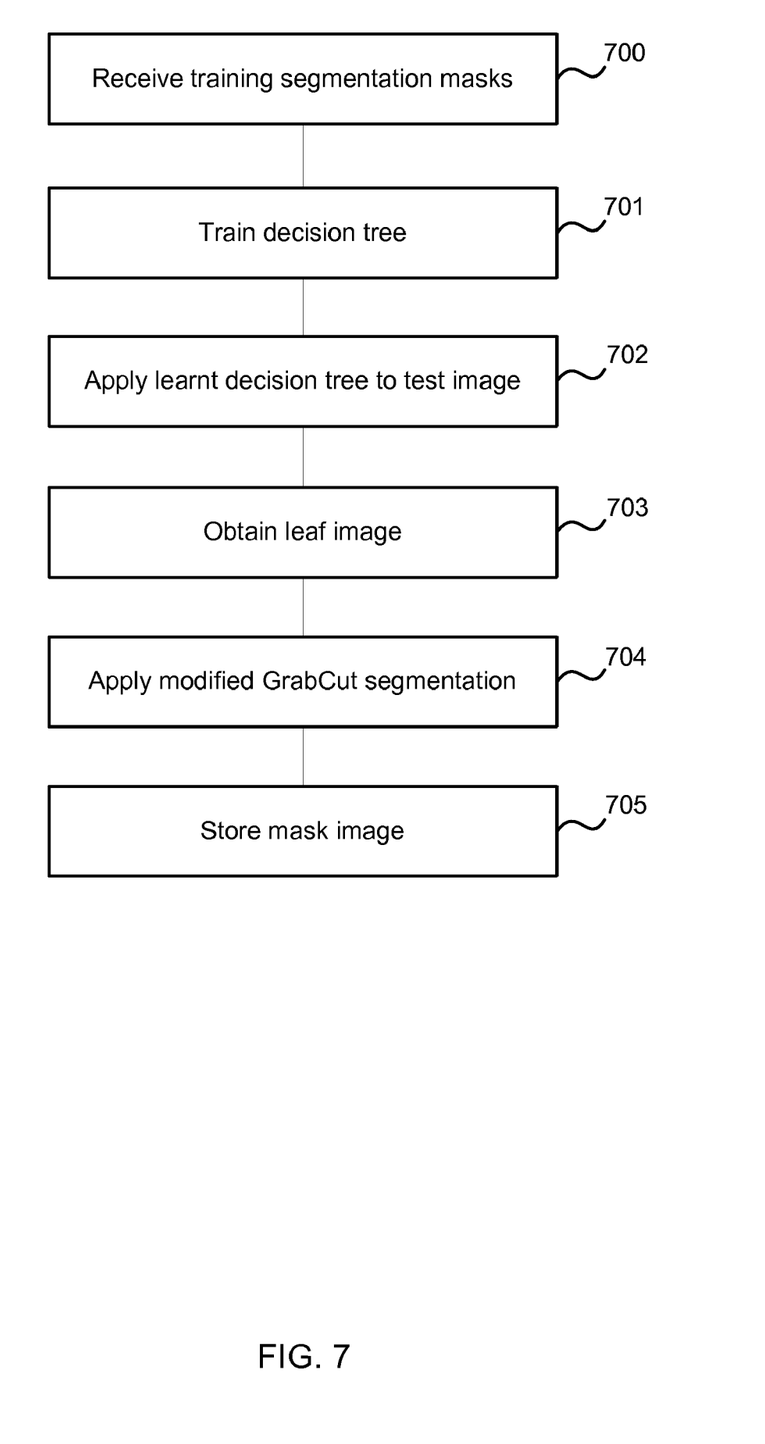
FIG. 7 is a block diagram of an example method of segmenting an image.

Any other suitable method of segmentation may be used. For example, trained decision trees may be used as described in more detail later with reference to FIG. 7.

A non-exhaustive list of other suitable segmentation methods is: background subtraction, stereo-based segmentation, motion-based segmentation.

A plurality of decision trees which have been trained in advance are available to the process. This plurality of decision trees may be referred to as a decision forest. More detail about the process for training the decision trees is given later in this document, for example, with reference to FIG. 8. The decision trees may have been trained using a computational cost aware process although this is not essential.

A pre-trained decision tree is accessed and applied to each pixel (or other image element) in the foreground region of the image (block 402). The decision tree gives an outcome which is the index of the leaf reached. These outcomes are stored in a leaf image (block 403). A histogram over all the leaf indices is then computed for the foreground region of the leaf image and stored (block 404). This process if then repeated (block 409) for another decision tree until all of the available decision trees have been used.

The histograms are then concatenated (block 405) and input to a multi-class classifier (block 406) which outputs a classification result for the image comprising a labeled image (block 407) which is stored. The classification result may be input to a user interface (block 408) to drive a software application for example. However, this is not essential. The classification result may be used for any required purpose.

Any suitable multi-class classifier may be used at block 406. A non-exhaustive list of examples is: a nearest neighbor classifier; a nearest neighbor classifier with Bhatacharyya distance; support-vector machine, boosting, a further decision forest.

Another Exemplary Method

Figure 5:
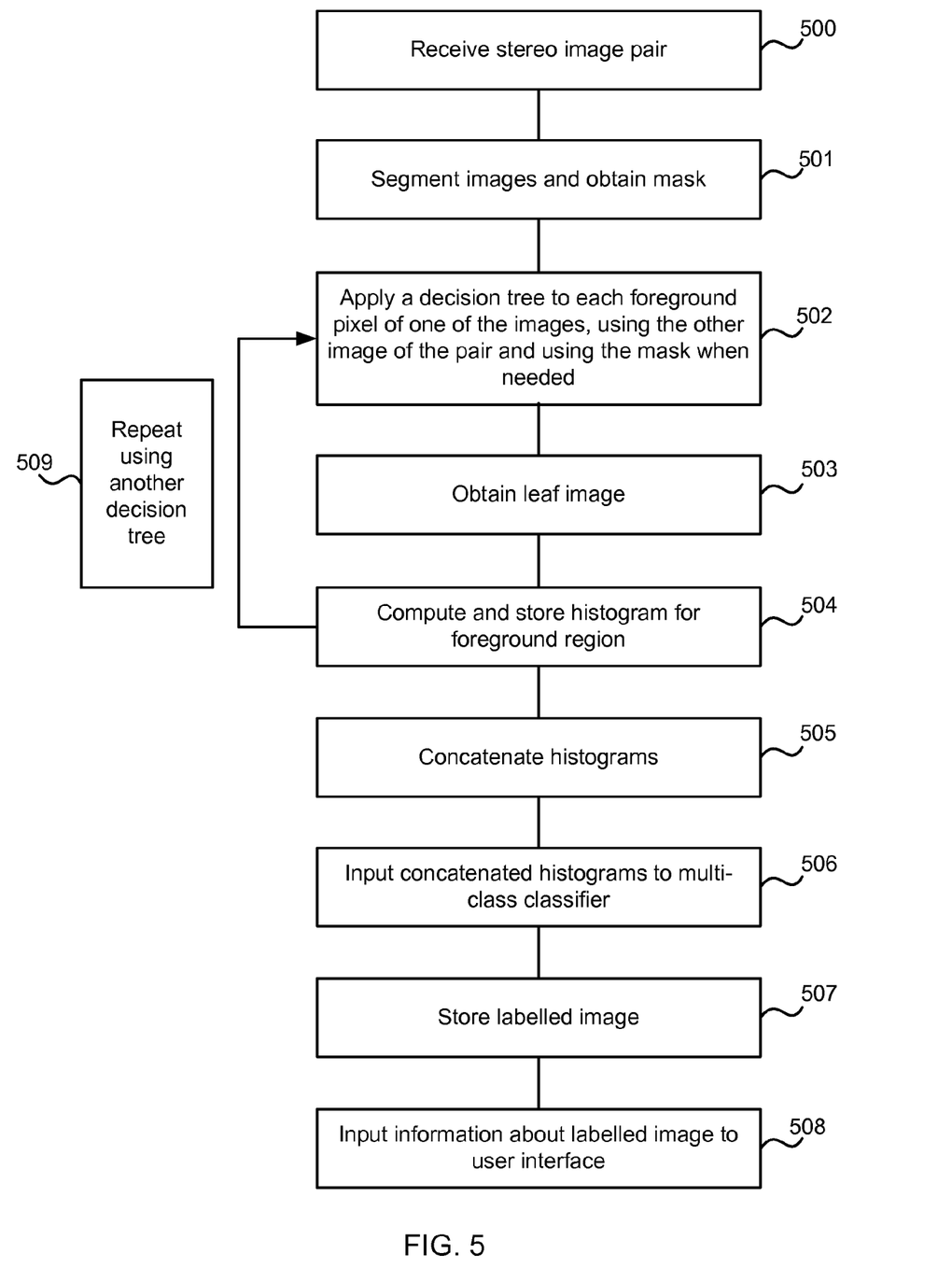
FIG. 5 is a block diagram of another example method of classifying an image.

FIG. 5 is a block diagram of another example method of classifying an image into one of a plurality of specified classes. In this case stereo image pairs are input to the system and stereo information is thus available to the classification process.

A stereo image pair is received (block 500) and at least one image of the pair is segmented into a foreground region and a background region (block 501) such that a mask image is obtained. This mask image corresponds to an image of the stereo pair but with the mask acting to block out background regions of the image and allow foreground regions to remain. Any suitable segmentation method may be used as described above.

A pre-trained decision tree is accessed. This decision tree may comprise various tests including tests requiring stereo information. The decision tree is applied to each foreground pixel of one image of the stereo pair. The other image of the stereo pair and/or the mask image is accessed when required by the tests in the decision tree (block 502). The results of the application of the decision tree comprise a classification outcome for each foreground pixel. These results are stored in a leaf image (block 503). A histogram over the classes is then computed for the foreground region and stored (block 504). This process is then repeated using another decision tree (block 509) until a plurality of decision trees have been applied.

The histograms are concatenated (block 505) and input to a multi-class classifier (block 506) which is of any suitable type as mentioned above. The resulting labeled image (507) is stored and optionally, information about the classification result is input to a user interface (block 508).

In some embodiments, a touch map may also be received (in addition to a stereo or mono image from the image capture device). This touch map comprises output from a touch-sensitive layer at the display. In this case the decision tree tests may comprise tests requiring information from the touch-map.

In a particular example, given an input image, a decision tree using tests $t_i$ is applied to each pixel of the image leading to a leaf label for each pixel. The leaf label corresponds to the index of the leaf reached in the tree. A histogram over all such labels for the foreground region is computed and classified using a nearest neighbor classifier with Bhattacharyya distance. This method is extended to use multiple decision trees (a decision forest) by concatenating the histograms prior to classification.

The methods described above with reference to FIGS. 4 and 5 each provide a unified process and a unified framework for recognizing hand poses, objects and optionally also, touch/no-touch situations in respect of the hand poses. One set of pre-trained decision trees are used and it is not necessary to use for example, a hand pose recognition module a separate object recognition module, and a separate touch/no-touch recognition module. This reduces computational expense and provides a fast and effective recognition system that may be used in real time to drive a user interface for example. Previously, the problems of recognizing object classes, hand gestures or touch detection have been treated as separate problems.

Figure 6A:
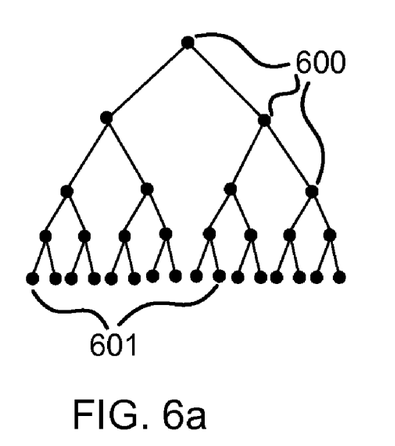
FIG. 6a is a schematic diagram of an example decision tree.

FIG. 6a is a schematic diagram of a decision tree. It comprises a root node with two branches. Each branch ends in a node which stores a test to be computed. That test has two possible outcomes. Thus the decision tree is a binary tree where each non-terminal node 600 evaluates a binary test based on an image feature. Each leaf node 601 corresponds to a classification outcome, classifying a pixel to which the decision tree has been applied, into one of the specified classes. Any suitable image features may be used. For example, appearance image features, shape image features and stereo image features. More detail about examples of possible image features is given later in the document.

Figure 6B:
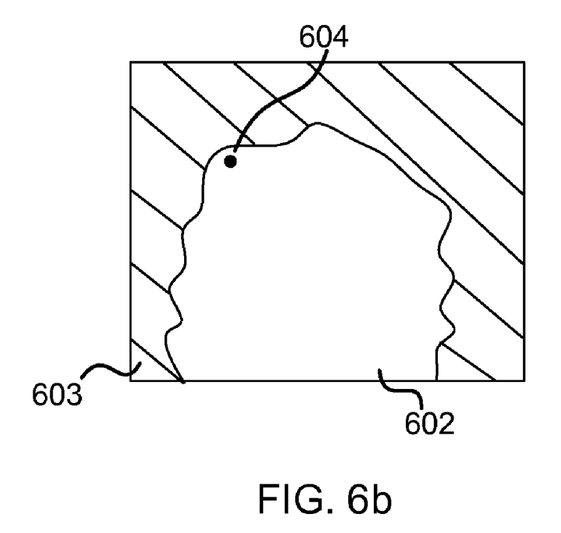
FIG. 6b is a schematic diagram of an image.

FIG. 6b is a schematic diagram of a segmented image to which the decision tree of FIG. 6a may be applied. A background region 603 of the image is known and the decision tree is applied to each pixel of the foreground region 602. For example, pixel 604 shows a pixel to which the decision tree is applied.

As mentioned above, the segmentation process may comprise using decision trees. This is now described with reference to FIG. 7. One or more training segmentation masks are received (block 700). These comprise images which have already been correctly segmented into foreground and background regions. The training segmentation masks are used to train a decision tree (block 701) in order to classify pixels or other image elements as being foreground or background. The learnt decision tree is then applied to a test image (an image which it is required to segment) (block 702) and a leaf image comprising the results is obtained (block 703). A modified GrabCut algorithm is then applied (block 704) as described in more detail below to obtain a segmented image. The resulting mask image is stored (block 705).

Using this learning procedure to perform the segmentation enables the segmentation process to deal with variable backgrounds and account for factors such as camera movement and change in lighting conditions. As mentioned above with reference to FIG. 7 a learnt decision tree is applied to a test image and a leaf image is obtained. A method based on GrabCut (which is described in detail in C. Rother et al. "GrabCut": interactive foreground extraction using iterated graph cuts. ACM Trans. Graphics, 23(3):309-314, August, 2004.) is then used. The method uses the output of the decision tree rather than a mixture of Gaussians as unary potentials. Also, the method described herein uses histograms over the leaf labels. The system is initialized either manually or automatically using aggregate foreground and background histograms across a training set. The segmentation and the foreground/background histograms are alternately updated for a numbers of iterations (which may be as few as two iterations). The features used in this segmentation process may be the same appearance features as are used in the classification stage although this is not essential.

Figure 8:
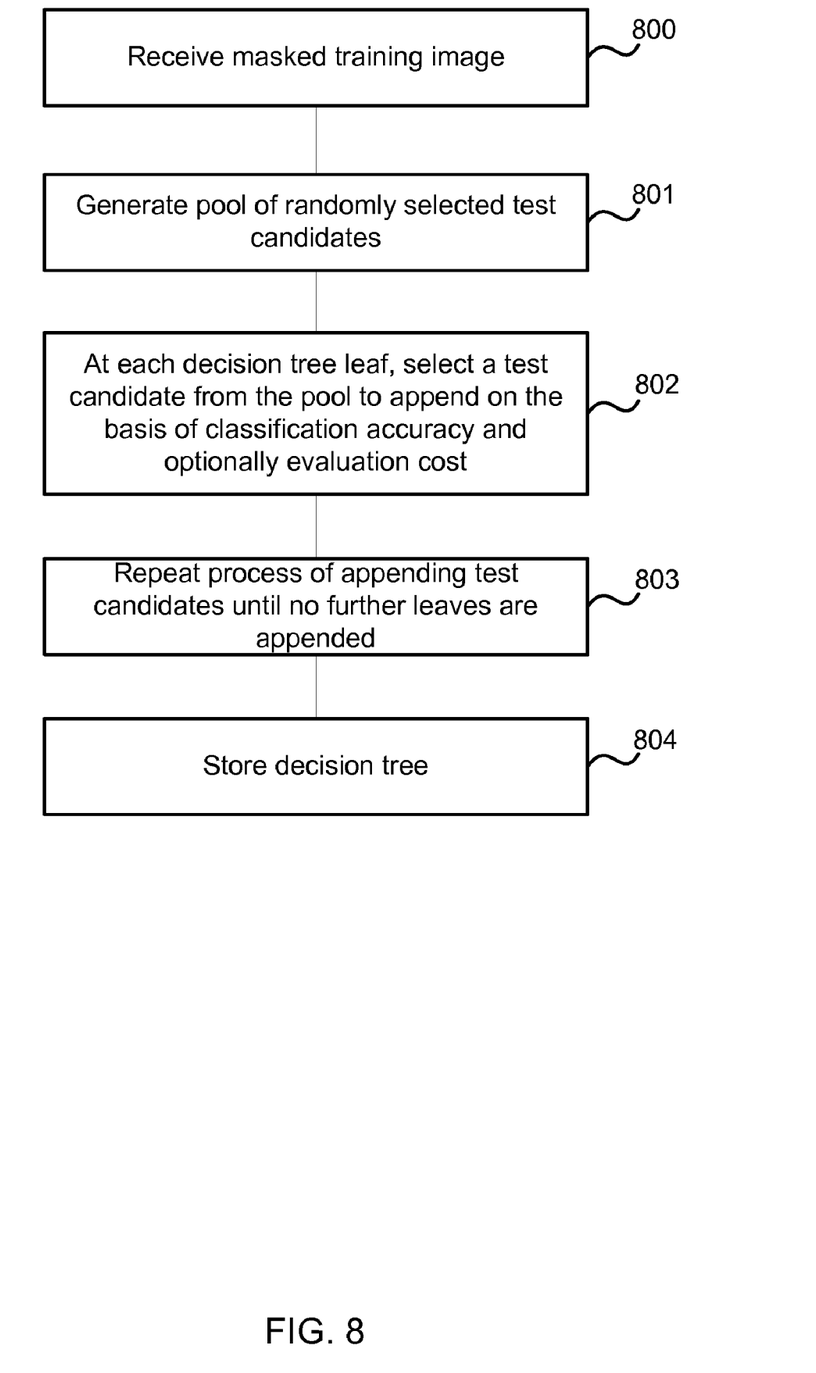
FIG. 8 is a block diagram of an example method of training a decision tree.

As mentioned above the decision trees for the image classification process are pre-trained. This is done using a plurality of images of items of known class which have already been segmented into foreground and background regions. These masked training images are received (block 800) and a pool of randomly selected test candidates are generated. These tests are suitable for use at nodes of a decision tree. For example, several hundred test candidates may be generated.

A decision tree is then formed by selecting test candidates from the pool. At each decision tree leaf, a test candidate selected from the pool is appended. The selection is made on the basis of classification accuracy achieved and optionally also on the basis of an evaluation cost (block 802). The evaluation cost is an indication of a cost of computing the test. For example, if the test involves examining stereo image features then it may generally be more computationally expensive than a test involving only appearance image features.

The process of selecting and appending test candidates is repeated until no further leaves are appended (block 803) and the resulting decision tree is stored (block 804).

By using a cost-aware training process as mentioned above, test candidates that are more computationally expensive are used relatively sparsely in the tree and tend to occur more frequently towards leaf nodes of the tree. In this way, more computationally expensive tests are used only when necessary. Thus the need to compute a dense stereo map from the received images is avoided, unlike the situation in many earlier recognition systems using stereo information. In addition, because computationally complex features are only computed at image elements where required to improve class discrimination, real-time performance is enabled. Previously, decision trees have not been trained in this manner. For example, a weighted version of the expected cost of evaluating the tree may be used during the learning process. In this way tree learning now minimizes a trade off of discriminatory performance and speed. This may be implemented by dividing the entropy gain for a test by a penalty value accounting for its computational cost. In this way more expensive tests are pushed toward the bottom of the tree and are applied to fewer image elements. For example, in some embodiments described herein, evaluation of tests for the stereo cues is more costly than evaluation appearance or shape tests. The penalization of stereo tests allows a smooth blend to be achieved between using stereo features and not using them.

In decision trees, in contrast to many other classifiers, not every test is applied to every observation (such as an image element). Instead, for every image element, only the tests along one path through the tree are evaluated. Thus features such as stereo features are computed on-demand rather than for example, computing a complete disparity map for the image.

The decision forest may be referred to as a random forest because of the randomness in the learning process (random generation of the pool of test candidates). Examples of random forests are described in detail in L. Breiman, "Random Forests" Machine Learning 45:5-32, 2001. A strength of random forests is that the trees in the forest capture different cues due to the randomness in the learning process. Each tree may be trained independently of the others which allows for parallel training of several trees. In each training iteration a pool of randomly generated test candidates is formed and at each leaf the test candidate with the highest entropy gain may be appended. This process may be continued until no further leaves are appended.

Examples of tests which may be used to form the decision trees are now described. These tests use image features such as visual cues related to any one or more of shape, depth and appearance. For example, texture filters are applied to obtain features $f_i$ which are used in the tests of the decision tree nodes. A test here refers to a Boolean decision rule applied to a feature vector. For example, the features used are texture filters and the tests compare these with two randomly selected thresholds. Thus, the tests may be of the following form:

$$t(x,y) = \theta_1 < f_i(x,y) < \theta_2, \quad (1)$$

where $f_i(x,y)$ is a feature function for position (x,y) in the image and $\theta_1$ and $\theta_2$ denote thresholds.

The features $f_1$ may be of different forms. For example, either they are the difference of two randomly selected pixels $p_1$ and $p_2$ within a bounding box centered in (x,y) (type 1) or they are just the value of one randomly selected pixel in this area (type 2):

$$f_1(x, y) = p_1(x + x', y + y')$$
$$\quad - p_2(x + x'', y + y'') \text{ (type 1)}$$
$$f_2(x, y) = p_1(x + x', y + y') \text{ (type 2)}$$

where $p_1(x,y)$ and $p_2(x,y)$ denote the values of pixels at these positions in specified color channels. All parameters and the type of the tests are randomly chosen in the generation of the test candidates. These tests may be applied to different visual cues and slightly adapted to the specific character of the cue. For example, three different visual cues may be used. Those visual cues being color (appearance), shape and depth as now described:

Color. To capture appearance information, tests are applied to RGB color channels. In the training process, 90% of all randomly generated appearance features may be features of type 1 (i.e. pixel differences), and the remaining ten percent may be absolute values. However, this is not essential. Different ratios of type 1 features and absolute values may be used. The advantage of pixel differences for appearance cues is a better invariance with respect to lighting changes.

Shape. A binary mask obtained from the segmentation stage may be used as an additional channel in the recognition phase to capture shape information. The tests applied to this mask may be of the same type as those applied to the appearance channels.

Depth. In an example, given a pair of rectified stereo images, depth information can be obtained by finding the correspondence of the pixels in the left image to the pixels in the right image for every scanline. For every pixel $p_r$ in a scanline of the right image, the corresponding pixel $p_l$ in the left image is determined within a certain disparity range $\Delta$. The displacement of $p_r$ to $p_l$ is the disparity ($d = p_r - p_l$) and is inversely proportional to the distance of the observed point in the image to the camera. To determine the correspondences of the pixel pairs, the sums of squared distances (SSD) between all pairs of pixels of a scanline is calculated and the optimal alignment of all pixels of the left scanline to all pixels of the right scanline is determined by algorithms such as dynamic programming or graph cuts.

It is possible to directly incorporate high quality disparity maps in the methods described herein. However, a faster way to incorporate stereo information is to use mean and variance disparities or winner takes all (WTA) disparities. For these, the calculation does not require any spatial coherence and therefore the computation is much cheaper.

The mean and the variance are calculated as follows:

$$\bar{d} = \sum_{d=0}^{\Delta} d \cdot p(d) \quad \sigma_d^2 = \sum_{d=0}^{\Delta} (d - \bar{d})^2 \cdot p(d)$$

where $$p(d) = \frac{1}{Z} \exp(-SSD(p_r, p_r + d))$$

and SSD is the sum of squared distances of 3×7 patches (or other sized patches) around the pixels in the current scanline of the left and right images. Z is a normalization factor. WTA disparities are calculated as $\hat{d} = \arg\max_d p(d)$.

To calculate the mean, variance, and WTA disparities, for each pixel matching costs for the whole disparity range $\Delta$ have to be calculated. To reduce the number of necessary computations further, a new stereo feature is used by subsampling the search interval $\Delta$ into a small number of allowed disparities and extracting a number of slices of the matching costspace for fixed disparities $d_i$. These are referred to herein as 'disparity cost slices' (DCS).

In one example, as stereo cues contain absolute values such as depth/distance to the camera, the features used in the test candidates for the tree training are chosen such that 50% of the features are of type 2 (i.e. absolute disparity/SSD cost) and the remaining 50% of the features are absolute disparity/cost differences. However, these proportions are examples only and other proportions may be used.

Exemplary Computing-Based Device

Figure 9:
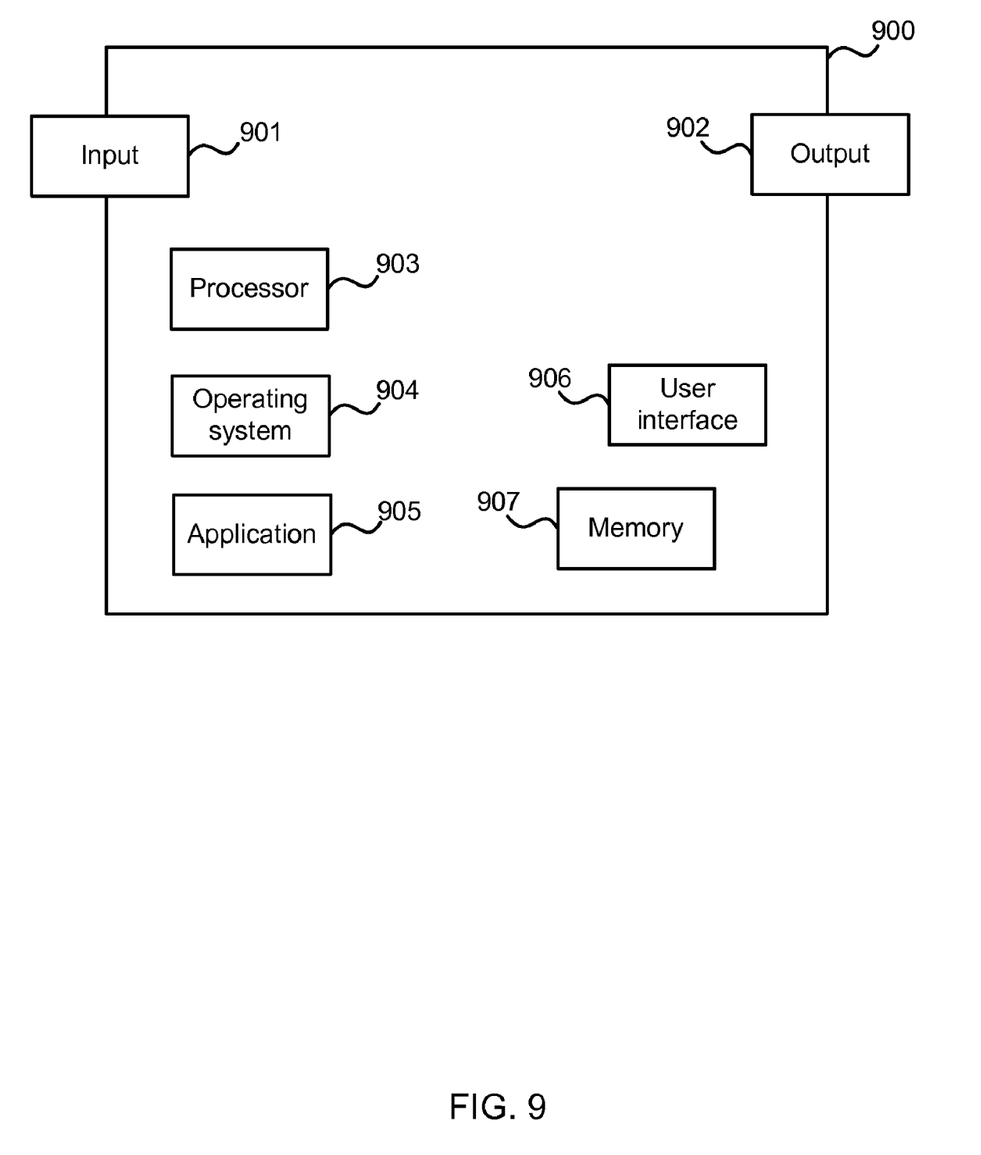
FIG. 9 illustrates an exemplary computing-based device in which embodiments of an image classification system may be implemented.

FIG. 9 illustrates various components of an exemplary computing-based device 900 which may be implemented as any form of a computing and/or electronic device, and in which embodiments of an image classification system may be implemented.

The computing-based device 900 comprises one or more inputs 901 which are of any suitable type for receiving images.

Computing-based device 900 also comprises one or more processors 903 which may be microprocessors, controllers or any other suitable type of processors for processing computing executable instructions to control the operation of the device in order to classify images of items into specified classes. Platform software comprising an operating system 904 or any other suitable platform software may be provided at the computing-based device to enable application software 905 to be executed on the device.

The computer executable instructions may be provided using any computer-readable media, such as memory 907. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. The display system may provide a graphical user interface 906, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. One or more computer-readable storage devices to store processor executable instructions that, when the instructions are implemented by one or more processors, configure the one or more processors to implement a method comprising:
   receiving at least one image of an item to be classified as one of a plurality of specified classes, those classes comprising hand pose classes and object classes;
   accessing a plurality of decision trees which have been formed in a training process using information at least about classification accuracy;
   classifying the image, using the one or more processors, into one of the classes using a unified recognition process at least by applying the plurality of decision trees to at least part of the image, the unified recognition process based in part on the plurality of decision trees being applied by a single module and are used to recognize hand poses, objects, and touch/no touch user interactions; and
   storing the classified image in memory.

2. The one or more computer-readable storage devices as claimed in claim 1 wherein accessing the plurality of decision trees comprises accessing decision trees which have been formed in a training process using information about classification accuracy and information about computational cost.

3. The one or more computer-readable storage devices as claimed in claim 1 wherein the process of receiving at least one image comprises receiving a stereo image pair.

4. The one or more computer-readable storage devices as claimed in claim 1 which further comprises inputting information about the classified image into a user interface in order to control a display.

5. The one or more computer-readable storage devices as claimed in claim 4 wherein receiving the image comprises receiving an image comprising one or more items against a background of the display.

6. An apparatus comprising:
   an input arranged to receive at least one image of an item to be classified as one of a plurality of specified classes;
   a memory arranged to store a plurality of decision trees which have been formed in a training process using information about classification accuracy and information about computational cost; and
   a processor arranged to:
      classify the image into one of the classes at least by applying the plurality of decision trees to a plurality of pixels of the image;

record an outcome for each decision tree applied to the plurality of pixels, the outcome being an index of a leaf on the decision tree that is reached during the application of the decision tree to the image;
compute a histogram for each decision tree based in part on the recorded outcomes; and
store the classified image into memory.

7. An apparatus as claimed in claim 6 which further comprises a user interface arranged to provide a display and wherein the processor is arranged to provide information about the classified image to the user interface in order to control the display.

* * * * *